Patented Jan. 7, 1941

2,227,885

UNITED STATES PATENT OFFICE 2,227,885

PROCESS FOR THE SEPARATION OF PHENOL-ALDEHYDE RESINS

Richard Hessen, Bautzen, Germany

No Drawing. Application August 2, 1937, Serial No. 157,067. In Germany August 3, 1936

5 Claims. (Cl. 260—59)

The resins resulting from the condensation of artificial resins, for example phenol formaldehyde condensation, are not uniform bodies but they consist of resins in an uninterrupted series of stages of condensation. The resins of these stages of condensation, which can be differentiated from each other on account of their molecular weight, possess amongst themselves different properties, for example in respect of solubility, plasticity, elasticity, viscosity and resistance towards alkalies, etc., in the hardened condition.

Thus for example resins formed in the later condensation stages in the hardened condition are more resistant towards alkalies and acids. They possess also much greater hardness and elasticity than those resins which are first formed on condensation. Since, however, a resin condensed in the usual way always as above mentioned contains resinous products in all stages of condensation, naturally the good properties of the well-condensed constituents are set off against the bad properties of the lesser condensed parts.

The present invention has for its object to produce resins with particular properties peculiar to the various condensation stages. This is effected by separation of the resins resulting from the condensation into resinous products of the desired condensation stages.

This is achieved by treating an artificial resin, for example a hardenable phenol-formaldehyde resin, in the dissolved condition with a precipitating agent and heating until precipitation begins, and then cooling. When the mixture is cooled part of the resin separates out and it is that part which has condensed the most. The proportionate amount is determined by the kind of resin, the amount of solvent and the degree of heating and cooling. The fluid phase is now treated further with the precipitating agent with heating until separation again occurs, it is again cooled and the resin which separates out is separated from the liquid. The operation is repeated until the resin has entirely or for the most part separated into portions by this fractional precipitation.

The process can be carried out as follows:

A resin produced in the usual manner, for example a phenol resin (resol) is dissolved in alcohol. This solution is heated to about 60° and thereupon water is added continuously accompanied by powerful stirring. Already on the first addition of water, a little resin flocculates which, however, dissolves away clearly with powerful stirring for the water has then dissolved itself uniformly in the alcohol. When the resin flakes which have precipitated are no longer dissolved (that is, permanent cloudiness begins) the addition of water is stopped and the whole is allowed to cool. During the cooling, a layer of resin separates which consists of the first fraction of separation containing the most condensed, that is the part having the highest molecular weight, and this is separated from the solution. The solution is again heated and again in the above described manner provided with water, and again cooled. The operation can be repeated until no longer any resin separates.

The fractions of resin obtained in this manner are covered with water and allowed to stand for some time, if necessary being kneaded in order to remove the solvent. Washing can be carried out in several stages also with various washing agents. The precipitate can for the purpose of purification be again dissolved and reprecipitated. The fractions which first separate after removal of the alcohol and after drying are solid bodies which can be pulverised. They have a high melting point and at relatively low temperatures under 100° C. are quickly converted into the final condition, for example at 80–90° within one to two minutes without the addition of hardening accelerators.

The fractions which separate out last of all remain plastic when cold even after removal of the alcohol and after drying. They take much longer to harden than the fractions which first separate.

So far only alcohol has been mentioned as a solvent and water as a precipitating agent. However any kind of solvent for resin and any kind of precipitant for resin can be used which is soluble in the solvent for the resin or in the resin solution.

Also further only alcohol and water are mentioned since the use of these agents yields the preferred embodiment. However what has been said before applies for other solvents and precipitating agents.

The quantity of water which is required for each precipitation is determined by the quantity of solvent used, according to the degree of condensation of the mixture, according to the desired lowest condensation stage of precipitation and according to the heating and cooling temperature.

The process can be so carried out that it is first determined by prior experiment what quantity of the desired high molecular resin is contained in the initial resin and what quantity of water for a given amount of solvent and for a given cooling temperature is necessary for the separation.

By heating the resin solution to high temperatures it is then possible to add this quantity of water without precipitation taking place on this addition.

The degree of precipitation can also be varied by selecting the quantity of solvent. The more solvent there is present the less resin separates on addition of a unit quantity by weight of water and on cooling.

The precipitation can also be influenced by varying the degree of cooling.

Preferably according to the invention two and more separately precipitated fractions are obtained. It is however also possible to separate only a fraction of the desired high molecular resin groups from the low molecular, the remaining solution being then further worked up or used with the low molecular resin products in any desired manner.

According to a preferred embodiment of the invention a resin, for example a phenol or cresol formaldehyde resol, is condensed as far as possible until equilibrium is reached, that is to say very far, and this resin is then subjected to the process according to the invention.

According to the known methods for the production of resins by condensation attention must be paid to the evaporation of the water following the condensation itself. In the course of this evaporation a further condensation occurs. It is therefore not possible to regulate matters so that absolutely always the same resin is obtained.

According to the preferred embodiment of the invention the condensation of the resin can be carried out from the very beginning without any regard to the fact that a further heat treatment on evaporation follows. It is therefore not necessary to work to a definite stage in the resin-phase so that dehydration is rendered possible.

The condensation itself can be very exactly determined so that every time the same resin results. Since by the process according to the invention neither alkalies which alter the resin, are used, nor precipitants, such as for example acids which in certain circumstances alter the resin, are used, and since the operation is not effected at temperatures at which a further condensation under the conditions of the reaction can take place, under the preferred conditions according to the invention it is possible to obtain a continuously uniform powdered resin. As solvent only inert organic solvents come into question which do not influence the resinous product. This also applies to the precipitating agent.

If condensation is carried on as far as possible according to the preferred embodiment of the invention whereby from the beginning the formation of high molecular resinous products is favoured, since the resinous phase is then very viscous and can no longer be dehydrated according to the usual methods of evaporation on dissolution, a kneading is from time to time desirable or necessary.

The temperatures during the separation should be kept moderate so that the further condensation is avoided.

*Example*

80 parts by weight of phenol, 67.2 parts by weight of 37% formaldehyde, 4 parts by weight of ammonia are condensed for 60 minutes and the aqueous layer removed. 100 parts by weight of a fluid resin results. The fluid resin is treated with 70 parts by weight of 96% spirit. The resinous solution is heated to between 50–60° and water is added continuously until the flakes formed no longer dissolve. The solution is now cooled to 20°. A portion of the resin now precipitates. This portion is separated, covered with water and allowed to stand for several hours. A solid resin results which can be pulverized and dried in the air.

The separated fluid is then again heated and treated with water until separation begins. After cooling, a resin again separates which is separated and covered with water. There results once again a resin which can be pulverized and dried in the air. The operation can be repeated 3 or 4 times until no more resin separates from the solution. The separated resins can be distinguished from each other by their hardness and plasticity, as well as by the chemical, mechanical and electrical properties of the hardened products obtained from them.

The resin fraction can be used for all purposes for which resins are used in known manner.

What I claim is:

1. A process for the separation of hardenable phenolaldehyde-type artificial resins for obtaining a high-molecular resin product of uniform consistency, which comprises preparing a warm alcohol solution of a resol resin mixture including resol resin products of different stages of condensation, adding water to the warm solution while agitating until permanent cloudiness begins, cooling the mixture to effect precipitation, and separating the precipitated high-molecular resins from the liquid.

2. A process for the preparation of hardenable phenolaldehyde-type artificial resins for obtaining a high-molecular resin product of uniform consistency, and also a low-molecular resin product of uniform consistency, which comprises preparing an alcohol solution of a resol resin mixture including resol resin products of different stages of condensation, heating the solution to a temperature of about 50 to 60 degrees C., adding water while agitating until permanent cloudiness begins, cooling the mixture to effect a first precipitation of a high-molecular product, separating the high-molecular resin from the liquid, again heating the separated liquid, adding more water, and again cooling and separating a second precipitated resin of lower molecular form than said first precipitated resin.

3. A process of preparing high-molecular hardenable artificial resin of uniform consistency and capable of quick conversion to hardened final condition at a temperature below 100 degrees C., which comprises dissolving in alcohol a phenolaldehyde-type resol resin including resol resin products of different stages of condensation, warming the alcohol solution to approximately 50 to 60 degrees C., adding water with agitation until permanent cloudiness begins, cooling the solution to approximately 20 degrees C., and separating the precipitated high-molecular resin.

4. A process of preparing a high-molecular hardenable resin of uniform consistency and capable of quick conversion to hardened final condition by a temperature of the order of 80 to 90 degrees C., which comprises condensing a phenolaldehyde-type artificial resol resin very far until substantial equilibrium is reached and the resinous phase is very viscous and difficult to dehydrate by evaporation and includes resol resin products of different stages of condensation, dissolving the resol resin in alcohol and warming the solution to approximately 50 to 60 degrees C., adding water with agitation until permanent cloudiness begins, cooling the solution to approximately 20 degrees C., and separating the precipitated high-molecular resin.

5. A process of preparing high-molecular hardenable artificial resin of uniform consistency and capable of quick conversion to hardened final condition at a temperature below 100 degrees C and also a lower-molecular artificial resin of like type of uniform consistency and likewise capable of hardening, which comprises dissolving in alcohol a phenolaldehyde-type resol resin including resol resin products of different stages of condensation, warming the alcohol solution to approximately 50 to 60 degrees C., adding water with agitation until permanent cloudiness begins, cooling the solution to approximately 20 degrees C., and separating the precipitated high-molecular resin, again heating the liquid fraction and adding further water with agitation until permanent cloudiness again begins, again cooling the solution and separating the precipitated low-molecular resin.

RICHARD HESSEN.